United States Patent [19]
Chiu, Jr.

[11] Patent Number: 5,183,307
[45] Date of Patent: Feb. 2, 1993

[54] PARTITION SYSTEM FORMING A VEHICLE STORAGE COMPARTMENT

[76] Inventor: Herbert Chiu, Jr., 8830 Via Andar #16, San Diego, Calif. 92122

[21] Appl. No.: 804,096

[22] Filed: Dec. 6, 1991

[51] Int. Cl.⁵ .............................................. B60R 11/00
[52] U.S. Cl. .................................. 296/24.1; 296/37.6; 296/37.12; 296/100
[58] Field of Search ................... 296/24.1, 36.6, 36.16, 296/100

[56] References Cited

U.S. PATENT DOCUMENTS

| | | | |
|---|---|---|---|
| 3,419,304 | 12/1968 | Sagimino | 296/99 |
| 3,954,296 | 5/1976 | Patnode | 296/10 |
| 4,507,033 | 3/1985 | Boyd | 296/37.6 |
| 4,580,827 | 4/1986 | Feagan | 296/37.6 |
| 4,635,992 | 3/1987 | Hamilton | 296/37.6 |
| 4,668,845 | 8/1987 | Kinglsey | 296/99 |
| 4,786,099 | 11/1988 | Mount | 296/100 |
| 4,909,558 | 3/1990 | Roshinsky | 296/37.6 |
| 4,909,561 | 3/1990 | Roshinsky | 296/37.6 |
| 4,917,429 | 4/1990 | Giger | 296/37.6 |
| 5,067766 | 11/1991 | Lovass | 296/100 |

OTHER PUBLICATIONS

Kaho, "The Latest Innovations in Bedcover Technology", *Sport Truck*, Feb. 1991.

*Primary Examiner*—Robert R. Song
*Attorney, Agent, or Firm*—Nydegger & Associates

[57] ABSTRACT

A partition system forming a separate enclosable storage compartment is mountable within an open storage bed of a vehicle having a floor, an end wall, and two parallel side walls. The partition system includes a partition wall stationarily fastened in the bed at an intermediate distance from the end wall. The partition wall along with the two side walls and end wall of the bed form the four vertical walls of the storage compartment while the bed floor is also the floor of the compartment. The open top of the compartment has a horizontally slidable lid for selective enclosure thereof. Positioned above the compartment is a fairing which provides a covering for the compartment and reduces drag from the passenger cab while the vehicle is in motion.

9 Claims, 5 Drawing Sheets

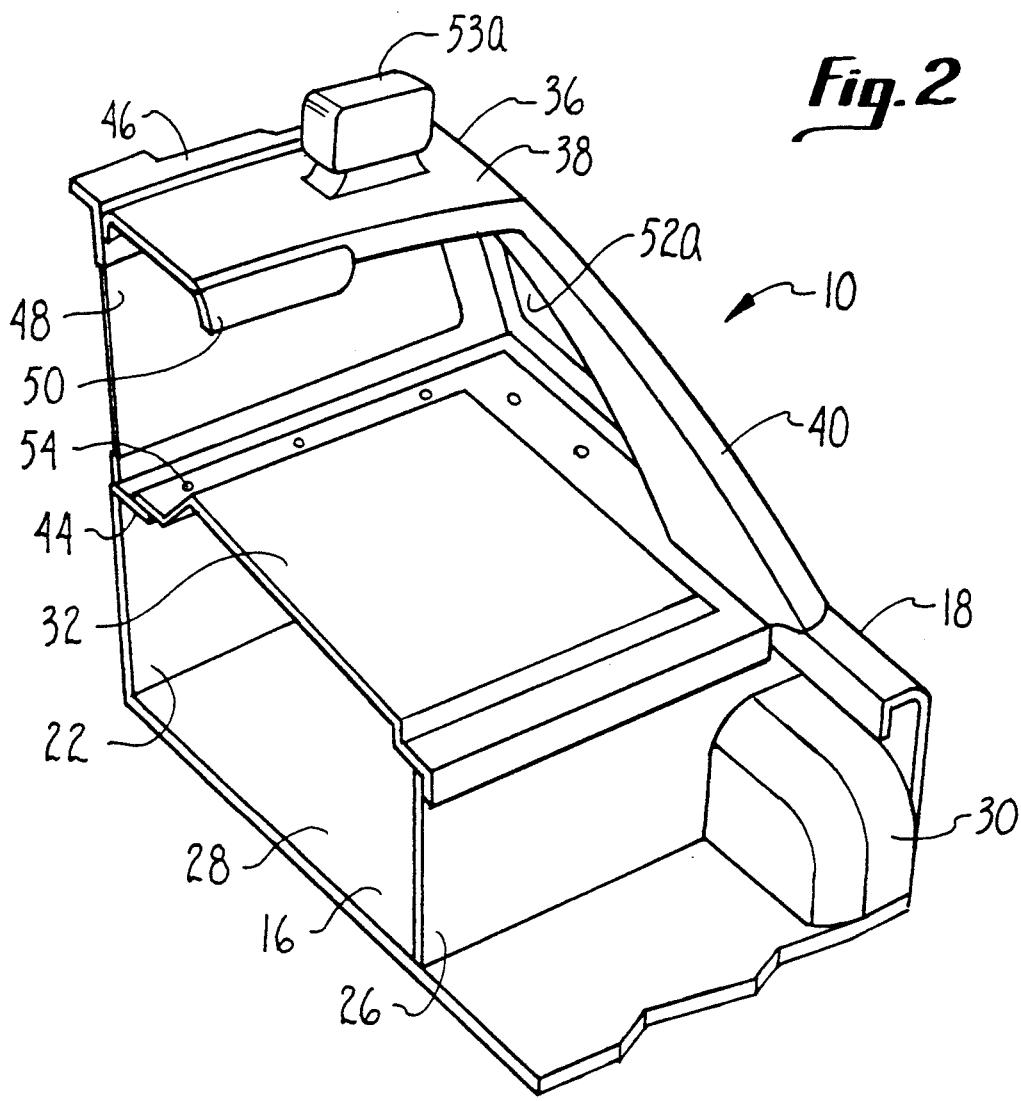
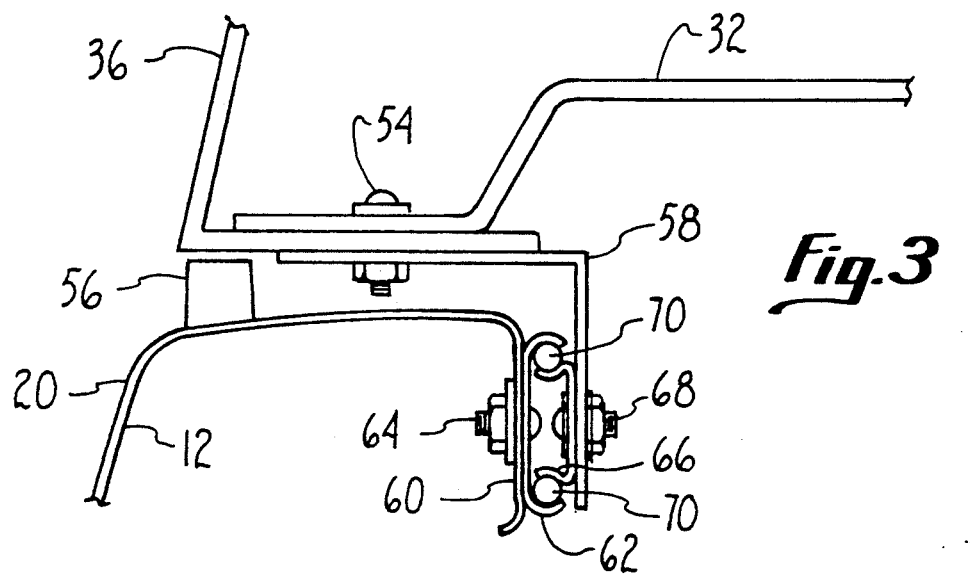

PARTITION SYSTEM FORMING A VEHICLE STORAGE COMPARTMENT

FIELD OF THE INVENTION

The present invention relates generally to vehicle storage compartments, and more particularly to a partition system positionable within a vehicle storage bed to form a separate enclosable storage compartment.

BACKGROUND OF THE INVENTION

Open bed trucks such as pickup trucks are popular for their versatility as both utility vehicles and passenger vehicles. When used as passenger vehicles, however, such trucks lack adequate covered and secure storage for items which would conventionally be carried in the trunk or passenger compartment of a passenger automobile. The reason for this shortcoming is that the truck bed is designed to remain open for carrying large items when the truck is used as a utility vehicle, while the truck cab is designed almost exclusively to carry passengers.

As an answer to this lack of secure covered storage space in open bed trucks, prefabricated enclosures have been developed which fit directly into the bed of the truck. These enclosures, commonly termed "tool boxes", typically have a hinged cover on their top which is raised upward to access the box. The cover is, however, oftentimes difficult to open while the user is standing on the ground beside the bed because of the height to which it must be raised. In order to easily open the tool box, the user must actually climb into the bed of the truck.

Open bed trucks are also used in their dual role as a passenger vehicle and a utility vehicle for transporting animals. When using the truck as a passenger vehicle, it is common to place house pets, and particularly dogs, in the open bed of the truck while the human passengers ride in the cab. This practice, however, subjects the pet to a high risk of injury in the event of an accident or other sudden maneuvering of the vehicle.

An open bed truck can alternatively serve as a utility vehicle for transporting livestock, and particularly smaller stock such as fowl, rabbits, and the like. Clearly, livestock requires containment within the open bed to prevent it from escaping.

Accordingly, a need exists for a covered and secure storage compartment to store articles in an open bed truck, wherein the storage compartment is more easily accessible than conventional hinged-cover tool boxes. Further, in view of the advent and popularity of smaller and lighter sport pickup trucks, a need exists for a relatively lightweight and inexpensive storage compartment for an open bed truck. Additionally, a need exists for a storage compartment which is relatively easy to remove from the bed and can be compactly stored when so removed. Finally, a need exists for a storage compartment which provides protection and containment of live animals during transport.

The partition system of the present invention satisfies these needs, providing a storage compartment in the bed of a truck which is readily accessible from beside the bed. The storage compartment provided by the partition system of the present system can also have utility for the transportation of animals. The storage compartment is lightweight and inexpensive because it incorporates portions of the bed walls and floor as its own walls. The storage compartment provided by the partition system is relatively simple to remove from the bed and has components which can be stacked for storage. The present partition system further combines structure having an advantageous aerodynamic function with structure having the above-recited function of a storage compartment.

SUMMARY OF THE INVENTION

The present invention is a partition system mountable within the storage bed of a vehicle, such as the bed of a pickup truck. The storage bed is characterized as having a floor, an end wall, and parallel side walls. The partition system is arranged and positioned in the bed to provide a separate enclosable storage compartment within the vehicle storage bed.

The partition system includes a partition wall stationarily fastened in the bed at a predetermined distance from the end wall. The distance between the partition wall and the end wall is less than the total length of the bed floor, thereby dividing the bed floor into a frontal area proximal the end wall and a rearward area distal the end wall. The partition wall is sized in correspondence with the dimensions of the bed such that the bottom and side edges of the partition wall abut the floor and side walls of the bed respectively.

The partition wall so positioned in the vehicle storage bed defines the enclosable storage compartment. The two side walls and end wall of the bed along with the partition wall of the system form the four vertical walls of the storage compartment. The frontal area of the bed floor is the horizontal bottom wall of the storage compartment. The top of the storage compartment is an opening that is provided with a horizontally slidable lid enabling selective enclosure of the compartment.

In the closed position, the lid fits between the two side walls of the bed and extends from the end wall to the partition wall, thereby covering the opening and fully enclosing the storage compartment. The system is provided with a guide which enables the lid to slide between the side walls in a direction parallel to the longitudinal axes thereof away from the end wall. Accordingly, sliding the lid along the guide away from the end wall repositions the lid to the open position which provides the user access to the interior of the storage compartment through the opening in the top.

Positioned above the enclosable storage compartment may be an aerodynamic fairing which has a continuous configuration forming a roof, a bottom crossbar, and two side walls. The front and back of the fairing are substantially open, but the bottom crossbar fits against the end wall such that the frontal opening of the fairing is substantially covered by the adjacent passenger cab of the vehicle. The side walls of the fairing join the side walls of the vehicle bed and the back of the fairing remains open. The profile of the fairing correlates with the profile of the passenger cab to reduce drag caused by the passenger cab when the vehicle is in motion, while beneficially providing the vehicle with a sleek aesthetic appearance. The fairing further functions to afford overhead protection for the exterior of the storage compartment.

The fairing is affixed to the lid so that it moves in unison with the lid during repositioning thereof. A locking mechanism is provided with the lid which enables the user to lock the lid in the closed position if desired. A restraint is also provided with the lid to act as a safety stop, limiting the range of motion of the lid in the open position.

The system is fabricated from durable weather-resistant materials. In an embodiment of the system wherein the storage compartment is used for tools, luggage, sporting equipment, or the like, the lid and partition wall are fabricated from waterproof materials, and seals are provided at the joints of the system to render the storage compartment substantially water-tight. In an alternate embodiment of the system, wherein the storage compartment is used for storage of animals such as pets, the sliding lid has a plurality of openings therethrough which allow adequate ventilation of the storage compartment interior. In yet another animal storage embodiment, the fairing is fixed to the bed and a rotatable lid having a grid configuration is substituted for the sliding lid. The grid is framed within the back opening of the fairing to fit over the topside opening of the storage compartment. Access to the interior of the storage compartment is provided by rotating the grid to an open position. The partition wall can also be provided with a hinged door to expand access.

The fairing of the present invention is fabricated from a waterproof material such as a high-strength plastic or fiberglass. A number of utilitarian enhancements may also be incorporated into the fairing including an elevated brake light mounted thereon, windows formed in each side wall of the fairing to enable visibility therethrough, or driving lights mounted atop the fairing. The utility of the storage compartment can be further enhanced by providing trays, tubs, bins, or the like which nest therein to organize and restrain stored articles. Subcompartments can also be created by providing additional divider walls which fit vertically within the storage compartment.

The novel features of this invention, as well as the invention itself, both as to its structure and its operation, will be best understood from the accompanying drawings, taken in conjunction with the accompanying description, in which similar reference characters refer to similar parts.

BRIEF DESCRIPTION OF THE DRAWINGS

FIG. 2 is a detailed cross-sectional perspective view of an embodiment of the partition system of the present invention and an associated storage bed.

FIG. 3 is a cross-sectional view of the mounting for the partition system of FIG. 2 in an associated storage bed.

DESCRIPTION OF PREFERRED EMBODIMENTS

Figure 1:
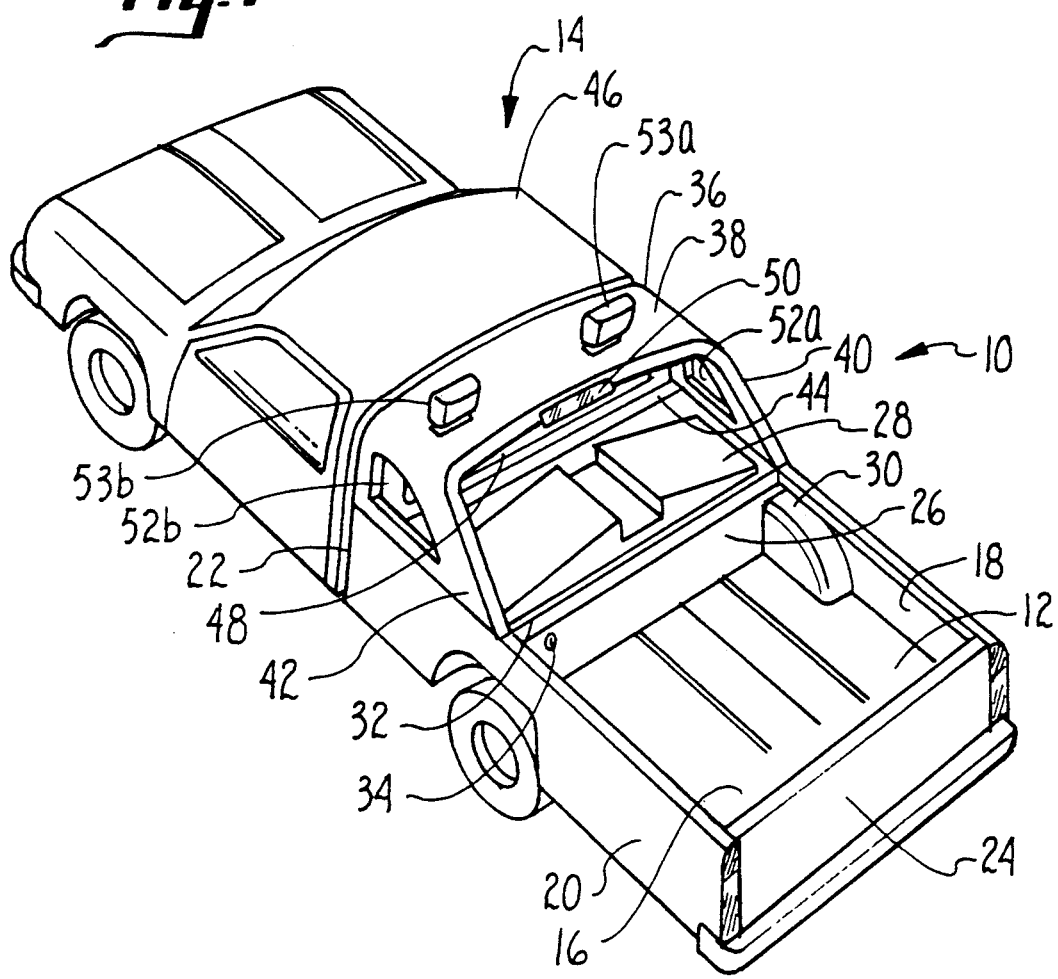
FIG. 1 is a perspective view of the partition system of the present invention positioned in the storage bed of a vehicle.

Referring initially to FIG. 1, an embodiment of the partition system of the present invention is shown which is generally designated 10. System 10 is mounted in the storage bed 12 of a vehicle which, as shown in FIG. 1, is a pickup truck generally designated 14. Storage bed 12 comprises a floor 16, two parallel side walls 18 and 20, an end wall 22, and tailgate 24.

Partition system 10 comprises a partition wall 26 parallelly positioned a predetermined distance from end wall 22 and fitting flush against side walls 18, 20 and floor 16. Partition wall 26 is fixed to side walls 18, 20 or floor 16 or both by a plurality of conventional fasteners (not shown), such as brackets and associated nuts and bolts, to be substantially stationary relative to bed 12. The distance from partition wall 26 to end wall 22 is less than the total length of floor 16. Partition wall 26, bed side walls 18, 20, end wall 22 and a frontal portion of floor 16 adjacent end wall 22 define the sides and bottom of a storage compartment 28 isolatable from the remainder of vehicle storage bed 12.

It is apparent that the predetermined distance between partition wall 26 and end wall 22 is the length of storage compartment 28. This predetermined distance is such that partition wall 26 is positioned in bed 12 over rear wheel wells 30 of floor 16 as shown, and the corner edges of partition wall 26 are shaped to conform with wheel wells 30. The predetermined distance is less than half the length of floor 16 so that a substantial portion of bed 12 remains open and useable apart from compartment 28.

Partition system 10 further comprises a slidable lid 32 positioned atop storage compartment 28. Lid 32 is slidably mounted to side walls 18 and 20 in a manner described hereafter, which enables repositioning of lid 32 between an open and closed position. FIG. 1 shows lid 32 in a closed position whereby it engages end wall 22 and partition wall 26 to fully enclose storage compartment 28. By sliding lid 32 horizontally between side walls 18 and 20 in a rearward direction away from end wall 22 while maintaining partition wall 26 fixed, an opening is provided in the top of storage compartment 28 to allow the placement of items therein for secure enclosed storage. Once the items are placed in compartment 28, lid 32 is returned to its closed position.

A conventional locking assembly 34 using a key is provided with partition system 10 to enable locking of lid 32 in the closed position, thereby enhancing the security of storage compartment 28. Items suitable for storage in compartment 28 include those items typically stored in a passenger car trunk or a pickup truck tool box, such as luggage, clothing, groceries, tools, sports equipment, etc.

Partition system 10 may additionally comprise an aerodynamic fairing 36 positioned over storage compartment 28. Fairing 36 has a roof 38, two side walls 40 and 42, and a bottom crossbar 44 forming a substantially open rectangular configuration. Fairing side walls 40, 42 abut side walls 18, 20 of bed 12 respectively and crossbar 44 abuts end wall 22. The front and back of fairing 36 are substantially open, but when positioned as shown, the frontal opening of fairing 36 is adjacent the passenger cab 46 of vehicle 14 which obstructs the opening. The frontal opening is aligned, however, with the cab window 48 to allow persons in 46 to see into bed 12 and vice versa. Although not shown, it is apparent that, if desired, the frontal opening of fairing 36 could alternatively be fully enclosed and provided with a window aligned with cab window 48.

Fairing 36 is contoured and dimensioned to reduce drag from cab 46 when vehicle 14 is in motion. Accordingly, the distance between side walls 40 and 42 is substantially the same as the width of cab 46 while the backside of side walls 40, 42 are sloped away from cab 46. The height of roof 38 is correlated to the height of cab 46, i.e., is substantially the same or is augmented by an integral or separate spoiler (not shown).

System 10 is fabricated from durable weather-resistant and waterproof materials which exhibit high strength and rigidity. Lid 32 is preferably formed from a molded ABS plastic and may be configured with contours on its top surface that increase storage capacity and allow water runoff. Partition wall 26 has a composite construction with rigid plastic face-sheets that are laminated onto a wood or plastic foam central core. Fairing 36 is fabricated from ABS plastic or fiberglass. As a safety feature an elevated brake light 50 may be integrally mounted on the back of roof 38. To improve lateral visibility, windows 52a, 52b may be provided in each side wall of fairing 36 to enable visibility therethrough. Finally, driving lights 53a, 53b may be mounted atop roof 38.

FIG. 2 shows partition system 10 in close-up cross-section. It is noted that crossbar 44 and the bottom edge of side wall 40 form a continuous apron which is partially overlapped by and supports the front and side edges of lid 32. FIG. 2 further shows fasteners 54 for attaching lid 32 to the apron of fairing 36. Attachment of lid 32 to fairing 36 and mounting of them onto storage bed 12 is now described with reference to FIGS. 3 and 4.

Referring initially to FIG. 3, lid 32 is fixably mounted on fairing 36 by means of fasteners 54 such that fairing 36 remains stationary relative to lid 32, and fairing 36 and lid 32 are unitarily slidable relative to bed 12. A strip of conventional trim molding 56 is positioned between fairing 36 and bed side wall 20 to the outside of fastener 54 which functions as a seal. Fastener 54 further attaches lid 32 and fairing 36 to an angle bar 58, which in turn slidably engages bed side wall 20 by means of guide 60. Guide 60 comprises a track 62 affixed to side wall 20 by fastener 64 and a rail 66 affixed to angle bar 58 by fastener 68. Rail 66 slides within track 62 on a plurality of friction-reducing ball bearings 70. A substantially identical guide is provided on the side of bed 12 opposite that shown in FIG. 3.

Figure 4:
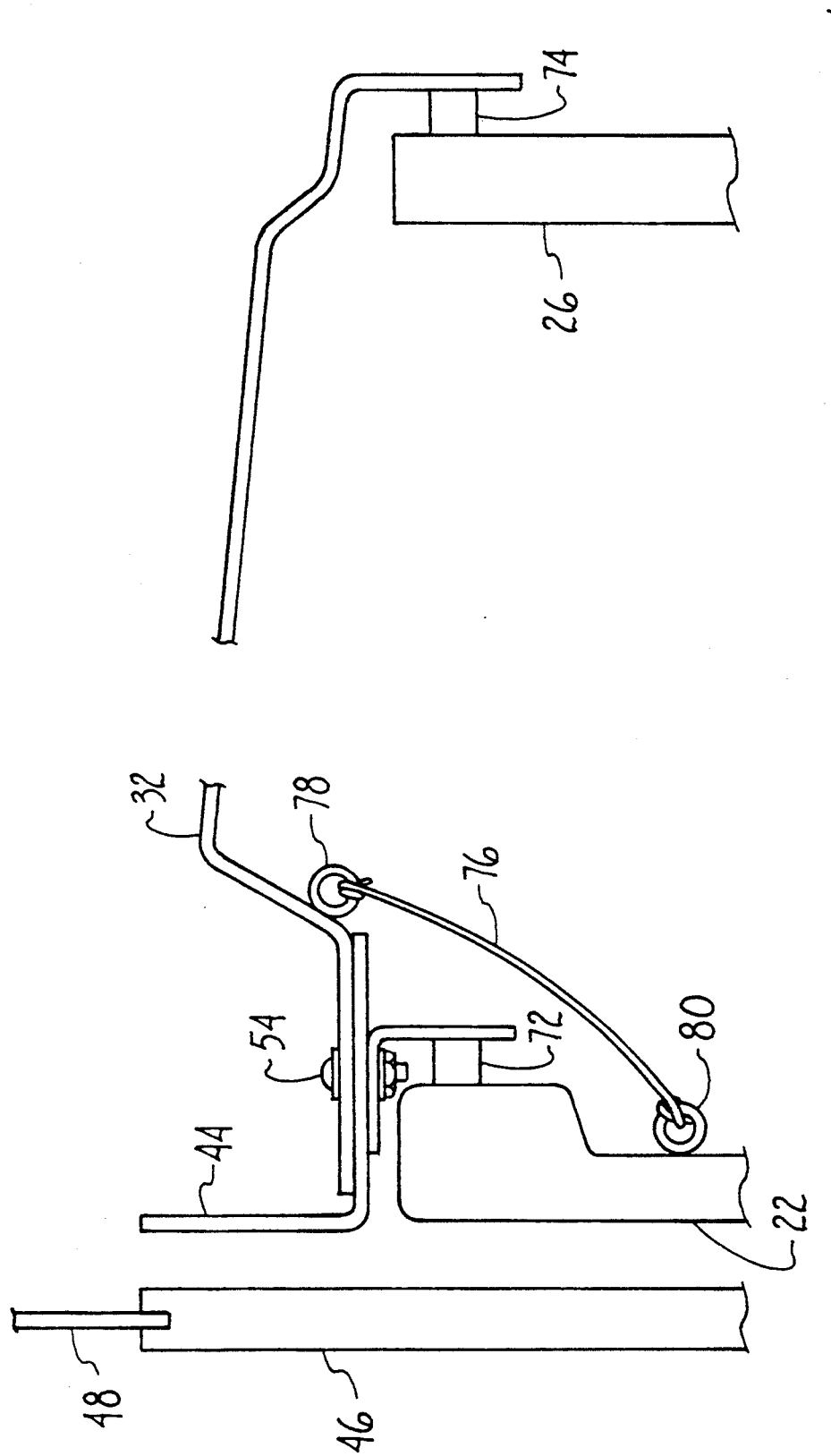
FIG. 4 is a longitudinal cross-sectional view of the mounting for the partition system of FIG. 2 in an associated storage bed.
Figure 5:
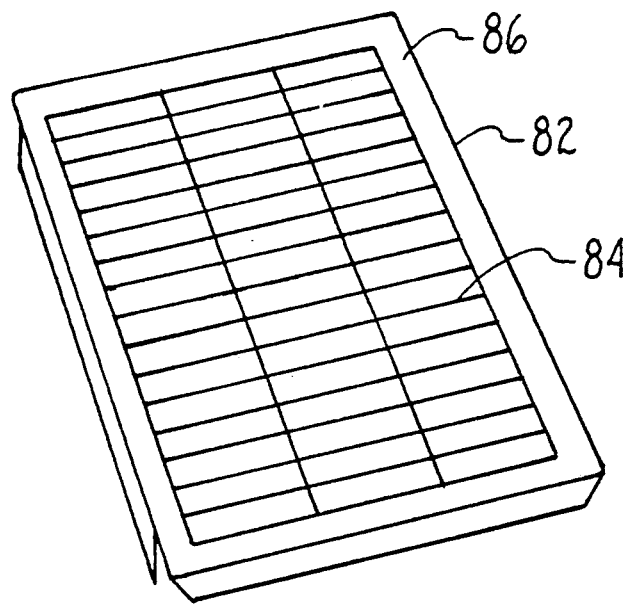
FIG. 5 is a perspective view of an alternate lid for the partition system of FIG. 2.

The embodiment of FIG. 3 is shown in longitudinal cross-section in FIG. 4. Lid 32 is affixed to crossbar 44 by means of fasteners 54. Seals 72 and 74 are provided forward and rearward to render compartment 28 watertight where lid 32 engages end wall 22 and partition wall 26 respectively when in the closed position. A restraint 76 may be provided which is a tether formed from a pliable cord. Restraint 76 is connected to end wall 22 and lid 32 by tying it to eyelets 78 and 80 that are affixed to end wall 22 and lid 32 respectively. Restraint 76 has a length substantially equal to that of guide 60 shown in FIG. 3. Although the guide (not shown here) is preferably provided with an integral stop to prevent the rail from running off the end of the track, restraint 76 acts as a backup to provide an extra margin of safety should the integral stop of the guide fail.

FIG. shows an alternate lid 82 which may be substituted for lid 32 shown in FIGS. 1 and 2. Rather than being formed from a continuous waterproof material, lid 82 has a grating 84 surrounded by a frame 86 which allows ventilation of the storage compartment 28 to the ambient environment. Grating 84 is preferably a rigid metal wire screen welded to frame 86 which is formed from a rigid metal.

Lid 82 is ventilated to enable safe and secure transport of live animals within storage compartment 28 without risk of escape. Lid 82 is attached to fairing 36 and slidably connected to bed 12 in the same manner as lid 32, thereby providing convenient placement of animals in storage compartment 28 and removal therefrom via the topside opening. Thus, partition system 10 can readily convert between a substantially weatherproof storage compartment for inanimate articles and a ventilated storage compartment for live animals simply by interchanging lids 32 and 82.

Given the modular nature of partition system 10, it is understood that variations of the system 10 other than those described above are also possible and fall within the scope of the present invention. For example, the above-described embodiments can be modified by elimination of the fairing 36 from the system 10. Alternatively, the fairing 36 can be stationarily installed by itself in the storage bed 12 to perform an aerodynamic as well as protective function in the absence of storage compartment 28.

Figure 6:
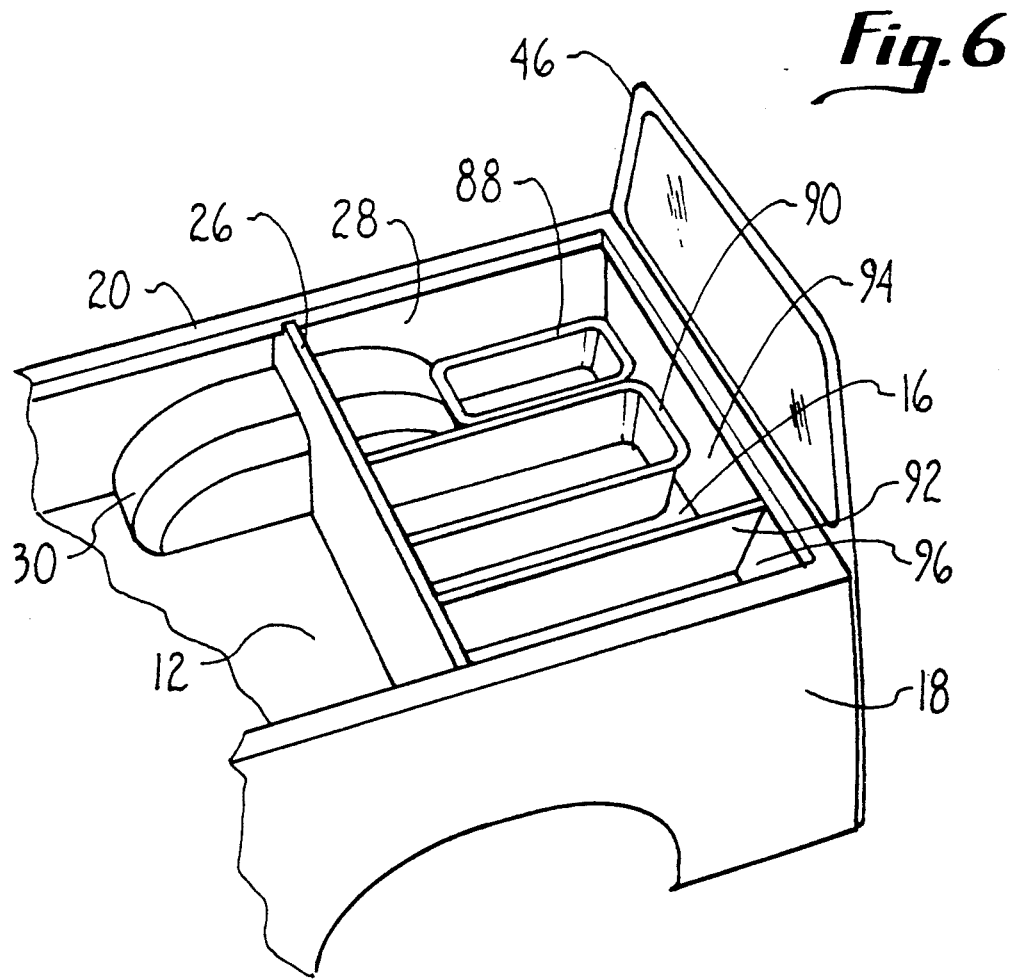
FIG. 6 is a perspective view of storage accessories having utility in the partition system of the present invention.

A number of storage accessories may further be incorporated into the storage compartment 28 of system 10. FIG. 6 shows storage accessories contemplated by the present invention, including removable storage bins 88 and 90 which are dimensioned to fit snugly in storage compartment 28. For purposes of clarity, compartment 28 is shown without a lid. Storage bins 88, 90 are of a molded plastic construction and are provided with an adhesive strip (not shown) to removably secure them with floor 16 as desired. Bins 88, 90 are employed to retain loose items, such as groceries, tools, or the like, and prevent them from shifting throughout the entire compartment 28 during transit. Bins 88, 90 further serve to shield their contents from moisture which can accumulate on floor 16.

Another storage accessory is a divider 92 which can be removably positioned in compartment 28 by conventional fastening means. Divider 92 further separates compartment 28 into subcompartments 94 and 96 for segregated storage of articles or animals.

Figure 7:
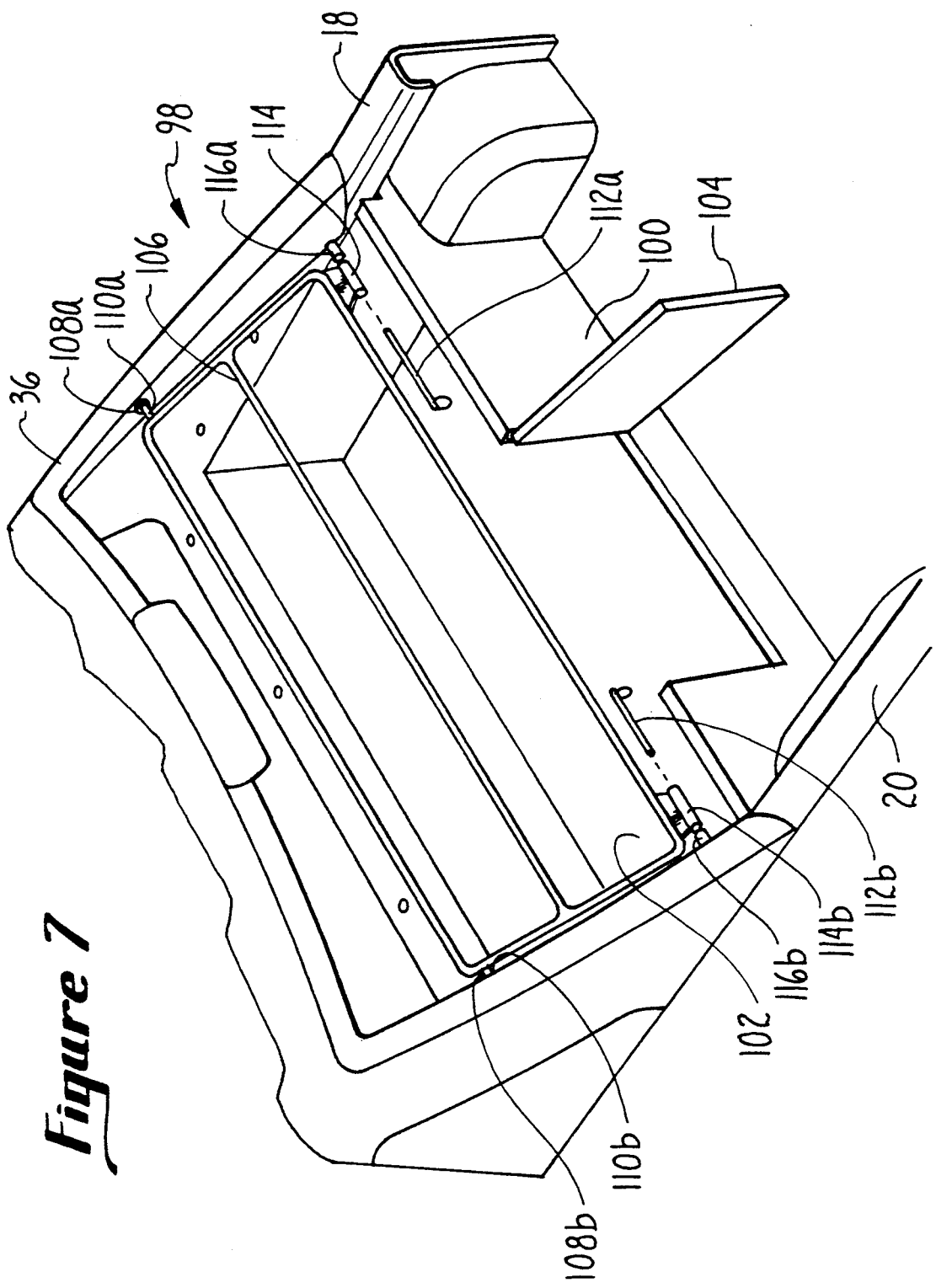
FIG. 7 is a perspective view of another embodiment of the partition system of the present invention and an associated storage bed.

FIG. 7 shows an embodiment of a partition system generally designated 98 which is adapted for transporting and storing larger animals such as dogs. Partition system 98 has a partition wall 100 anchored in vehicle storage bed 12 in substantially the same manner as system 10 to form a storage compartment 102. Unlike system 10, however, partition wall 100 is provided with a latchable hinged door 104 while a stoping metal grid 106 covers compartment 102. Grid 106 is mounted in fairing 36 by rotatably positioning fixed pivot pins 108a and 108b, located at the upper end of grid 106 in corresponding holes 110a and 110b of fairing side walls 40 and 42. Slidably removable lockpins 112a and 112b are provided for placement through tubular retainers 114a and 114b at the lower end of grid 106 and insertion into corresponding receptacles 116a and 116b of fairing side walls 40 and 42.

When it is desired to access storage compartment 102, hinged door 104 is opened and lockpins 112a, b are removed as shown in FIG. 7 to upwardly rotate grid 106. Securing of storage compartment 102 is accomplished simply by closing and latching door 104 while grid 106 is rotated downward and lockpins 112a, 112b are replaced in receptacles 116a, 116b.

Figure 8:
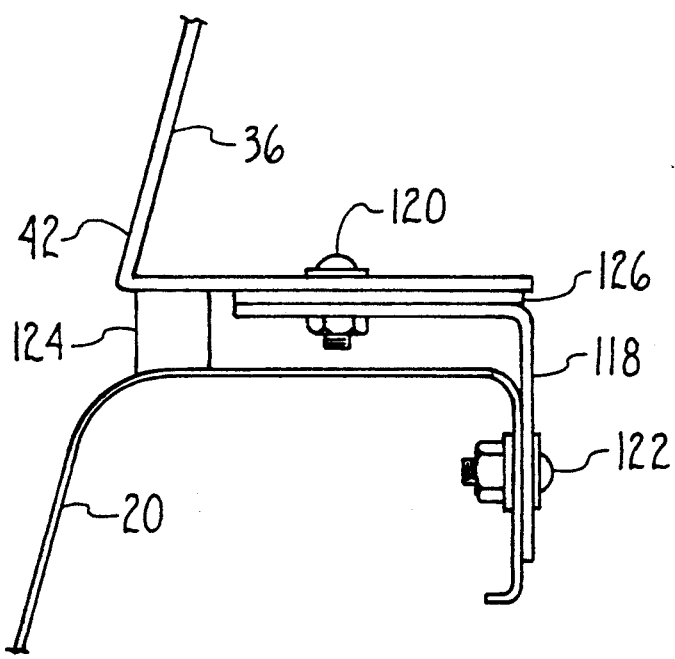
FIG. 8 is a cross-sectional view of the mounting for the partition system of FIG. 6 in an associated storage bed.

In the embodiment of FIG. 7, fairing 36 is stationarily mounted to bed 12. Details whereby fairing 36 is mounted to bed 12 are shown in FIG. 8 and described as follows. Fairing side wall 42 is affixed to an angle bar 118 by fastener 120 which in turn is affixed to bed side wall 20 by fastener 122. An elastomeric seal 124 is provided between fairing 36 and bed side wall 20 on the outside of fastener 120. A shock absorbing gasket 126 formed from rubber, or the like, is positioned between fairing 36 and angle bar 118.

While the particular partition system as herein shown and disclosed in detail is fully capable of obtaining the objects and providing the advantages hereinbefore stated, it is to be understood that it is merely illustrative of the presently preferred embodiments of the invention and that no limitations are intended to the details of construction or design herein shown other than as described in the appended claims.

I claim:

1. A partition system providing an enclosable storage compartment in a vehicle bed, wherein said bed has first and second substantially parallel side walls, an end wall, and a floor, partition system comprising:

a partition wall substantially fixed in said bed abutting said floor and said first and second side walls and spaced a predetermined distance from said end wall to form a storage compartment defined by said side walls, end wall, floor and partition wall;

a lid spaced above said floor slidably engaging said first and second side walls, said lid slidable along said first and second side walls between an open position and a closed position, wherein said lid substantially fully encloses said storage compartment when said lid is in said closed position and further provides access to said storage compartment via an opening when said lid is in said open position;

means for guiding said lid between said open and closed positions including a first track affixed to said first side wall and a first rail fixably connected to said lid, such that said first rail is received by said first track, further wherein said guiding means is a second track affixed to said second side wall and a second rail fixably connected to said lid, such that said second rail is received by said second track; and a fairing extending from said bed and fixably connected to said lid.

2. A partition system as recited in claim 1 wherein said first and second tracks are aligned substantially parallel to said floor to define a sliding path for said lid between said open and closed positions which is substantially parallel to said floor.

3. A partition system as recited in claim 1 wherein said partition is positioned in said bed substantially parallel to said end wall.

4. A partition system as recited in claim 1 wherein said vehicle has a passenger cab and said fairing has a frontal profile substantially corresponding to the frontal profile of said passenger cab.

5. A partition system as recited in claim 1 further comprising a restraint means for retaining said first and second rails in said first and second tracks when said lid is in said open position.

6. A partition system as recited in claim 1 wherein said partition wall is conformed to engage a first wheel well in said first side wall and a second wheel well in said second side wall.

7. A partition system as recited in claim 5 wherein said restraint means is a tether attached at opposite ends to said bed and said lid.

8. A partition system providing an enclosable storage compartment in a vehicle bed, wherein said bed has first and second substantially parallel side walls, an end wall, and a floor, said system comprising:

a partition wall substantially fixed at an intermediate point in said bed abutting said floor and said first and second side walls and spaced a predetermined distance from said end wall to form a storage compartment defined by said side walls, end wall, floor and partition wall, said storage compartment having a topside opening;

a lid spaced above said floor slidably connected to said first and second side walls, said lid slidable along said first and second side walls between an open position and a closed position, wherein said lid fits over said opening in said closed position and exposes said opening in said open position;

means for guiding said lid between said open and closed positions; and a fairing positioned adjacent to and over said lid in said closed position, said fairing having a roof, two parallel fairing side walls, and a backside opening and with said fairing stationarily fixed to said lid and slidably connected to said first and second side walls in correspondence with said lid.

9. A partition system as recited in claim 8 wherein said guiding means is a first track affixed to said first side wall and a first rail fixably connected to said lid and said fairing, such that said first rail is received by said first track, further wherein said guiding means is a second track affixed to said second side wall and a second rail fixably connected to said lid and said fairing, such that said second rail is received by said second track.

* * * * *